March 25, 1958     T. R. SCHULZ     2,828,169

RESILIENT SIDE BEARING

Filed Aug. 30, 1954

Inventor:
Theodore R. Schulz
By Wilmer Mechlin
his Attorney

United States Patent Office 2,828,169
Patented Mar. 25, 1958

2,828,169

RESILIENT SIDE BEARING

Theodore R. Schulz, Prospect Heights, Ill., assignor to The Symington-Gould Corporation, Depew, N. Y., a corporation of Maryland Application August 30, 1954, Serial No. 452,881

6 Claims. (Cl. 308—138)

This invention relates to resilient side bearings for railway vehicles and has for its primary object the provision of an improved resilient side bearing wherein the relatively movable parts are spaced entirely by rubber and the rubber is subjected to shear, alone, by the relative movement of its parts under load.

In Blattner application, Serial No. 341,757, filed March 11, 1953, now Patent No. 2,788,250, it is pointed out that a resilient side bearing required loading to enable it to act against the underside of a car body with sufficient force to prevent car body nosing and truck shimmying and that the ideal side bearing would maintain this loading constant over its full range of travel under operating conditions. The requirements of an ideal side bearing are closely approached by the side bearing of that application. They are even more closely approached by that of this application by limiting the forces on the rubber under vertical load to shear forces and eliminating variations in the compression of the rubber over the range of travel of the side bearing.

Another object of the invention is to provide an improved resilient side bearing in which rubber bonded between relatively movable metal parts and so arranged as to be subjected to shear alone by the forces acting on it under vertical load, is precompressed for prolonged effective life of the bond.

An additional object of the invention is to provide an improved resilient side bearing whereby noise in operation is eliminated by spacing the metal part of the side bearing, which moves in operation, from both its stationary metal part and the contacted part of the car by non-metallic sound-deadening means.

A further object of the invention is to provide an improved resilient side bearing which is efficient in operation and the metal parts of which may be made from structural shapes for economy in manufacture.

Other objects and advantages of the invention will appear hereinafter in the detailed description, be particularly pointed out in the appended claims, and be illustrated in the accompanying drawings, in which:

Figure 1:
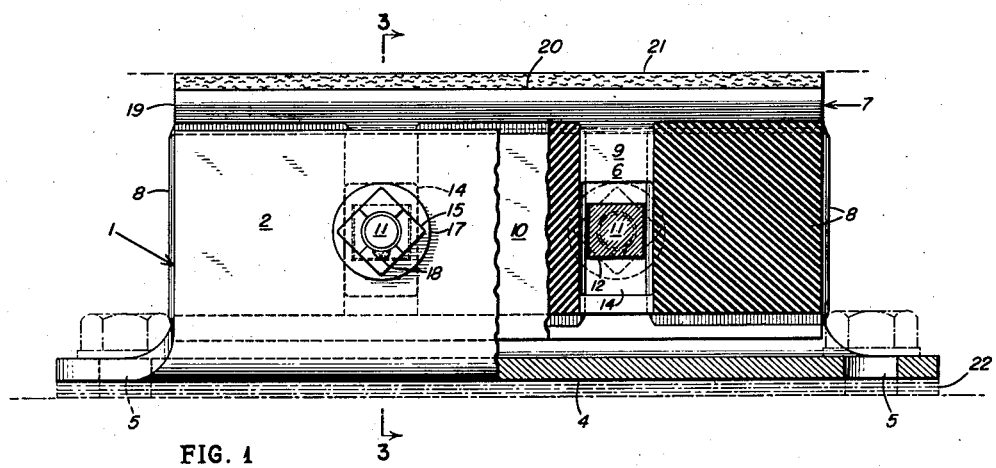
Figure 1 is a side elevational view of a preferred embodiment of the side bearing of the present invention, with portions broken away and shown in section to more clearly illustrate certain of the details of construction.

Referring now in detail to the drawings, in which like reference characters designate like parts, the improved resilient side bearing of the present invention is comprised of a base member or housing 1 having a pair of upstanding or upright transversely or laterally spaced side walls 2 whose inner confronting faces 3 are substantially planar and parallel. The side walls 2 surmount a base 4 which may be a base plate common to and integral with the side walls, as in the illustrated embodiment, or a multi-part base, depending on whether the base member is fabricated or cast and on the type of truck bolster or side frame (not shown) on which it is to be mounted.

The disclosed preferred embodiment is also illustrative of the preferred mode of construction of the metal components or parts of the side bearing in which, for economy in manufacture, the several components are fabricated from structural shapes or pieces. In the form shown, in which the base plate 4 is integral with the side walls 2, the base member 1 is of U-shape in vertical section and may conveniently be stamped from a flat plate. The base member is designed to be bolted or otherwise fixed to the truck bolster or side frame to which it is applied, the base plate 4 for this purpose being provided with bolt holes 5 in either end beyond the ends of the side walls 2.

Housed between the inner faces 3 of the side walls 2 is a substantially flat or parallel-sided stem or tongue 6 of a T-shaped cap, cover member or shoe 7 and the means by which vertical movement of the cap and base members is yieldably resisted. This means is constituted by a plurality of natural or synthetic rubber pads 8 bonded to the sides 9 of the stem 6 of the cap member 7 and spacing the stem substantially equidistant from or midway between the inner faces 3 of the side walls 2 of the base member 1. The rubber pads may be bonded directly to the side walls 2 but, preferably, are bonded to flat side plates 10 which directly engage the side walls. This sandwiching of the pads between the tongue and the side plates enables the cap member and resilient means to be inserted or removed as a unit without disturbing the housing.

For holding the cap member and its pads within the housing, there are provided one or more bolts or studs 11 (preferably two), disposed intermediate the vertical limits of the inner faces 3 and extending transversely through the side walls and the intervening side plates 10 and tongue 6. These bolts may be headed at one end or, as shown, threaded at both ends, and their shanks 12 may be square or round, square shanks with corresponding rectangular slotting of the side walls, plates and tongue, being preferred as providing better bearing conditions under forces tending to move the cap member laterally relative to the base member.

It will be noted that the lateral clearance between the shanks 12 of the bolts 11 and the side walls 2 and side plates 10, while sufficient to permit ready insertion of the bolts, is such that the side plates are carried by and locked or fixed in position relative to the side walls. Thus, the inner faces 13 of the side plates 10, relative to the rubber pads 8, in effect serve as the inner faces of the side walls when the components of the side bearing are in assembled relation. The slotting of the tongue 6, however, is of greater extent to provide vertically elongated slots 14 of sufficient length to encompass the range of vertical movement of the tongue relative to the side plates 10 from the height of the cap member with the rubber pads free (about one-half an inch above that shown), the condition on initial insertion of the cap member 7 in the housing 1, through the working or installed height of the side bearing, shown in the accompanying drawings, to the solid height of the bearing. Not only are the slots 14 elongated vertically but they are enlarged horizontally, as well, relative to the bolt shanks 12, the horizontal or lateral clearance being necessary to prevent metal-to-metal contact in normal operation and, when the shanks are square, to accommodate angling of the cap member longitudinally of the base member under certain forces.

Figure 2:
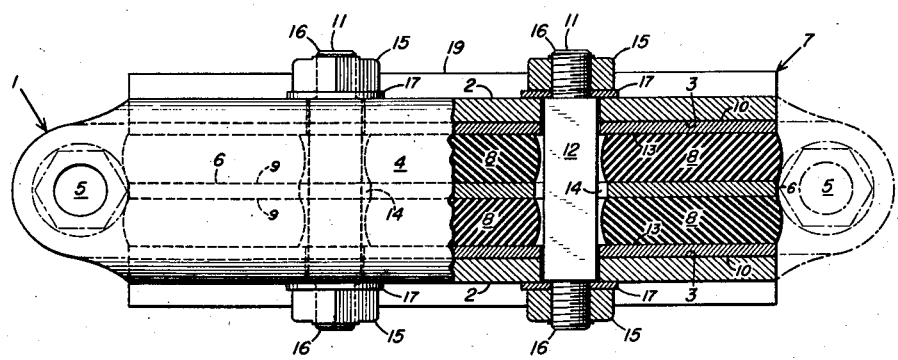
Figure 2 is a bottom plan view of the side bearing of Figure 1, with portions broken away and shown in section to more clearly illustrate certain of the details of construction.
Figure 3:
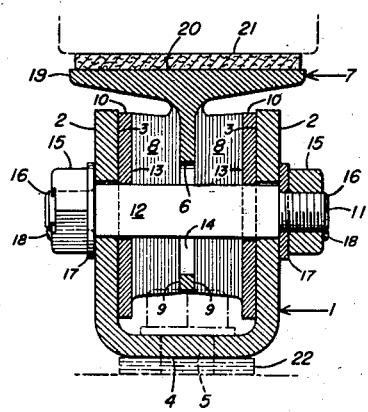
Figure 3 is a vertical sectional view taken along the lines 3—3 of Figure 1.

The rubber pads 8, while substantially coterminous vertically with the tongue 6, are not also coextensive in length. Instead, there preferably are a plurality of rubber pads bonded to each side of the tongue and the pads so spaced, longitudinally of the tongue on each side of the slots 14, as to clear the shanks 12 of the bolts during relative vertical movement of the cap member. The bulging of the rubber pads 8 shown in Figure 2 is the result of predetermined lateral compression under which they are placed by their insertion between the side walls 2 of the base 4, this compression being maintained in case of the one-piece base of the illustrated embodiment by the nuts 15 on the threaded ends 16 of the bolts and, if the base is multi-piece, being both applied and thereafter maintained by tightening of the nuts. It has as its purpose to more equally distribute the shear forces under vertical load over the thickness of the pads, rather than concentrating it in the bonds between the tongue 6 and side plates 10, as would otherwise be the case. This lateral compression thus effects a marked prolongation in the life of the side bearing. However, if excessive, it would interfere with the action of the side bearing. Consequently, the shanks 12 of the bolts 11 are made of such length that the nuts 15, when pulled up tight, will automatically fix the spacing between the side walls 2 to place the rubber pads under the correct amount of compression, wear on the side walls that may interfere with this adjustment being prevented by the interposed washers 17. Once the nuts 15 have been drawn tight they may be locked against accidental rotation by any suitable means such as the illustrated tack welds 18.

Anchored to the truck bolster or side frame through its base member 1, the side bearing acts against the underside of the overlying portion of the car body (not shown), usually the body bolster (not shown) through the flat-topped head or cross-piece 19 of the T-shaped cap member 7. Integral with the tongue 6 and with its upper surface or top 20 disposed normal thereto, the head and tongue conveniently may be cut as a unit from a standard T-beam. The head 19 preferably is substantially coextensive longitudinally with the side walls 2 and overlaps them laterally so that any over-solid blows will be distributed equally between the side walls.

In the conventional side bearing there is metal-to-metal contact between the side bearing and the car body. The objections to this are that it creates noise on any relative lateral movement between the side bearing and the car body and also is relatively ineffective in resisting such lateral movement. Both the desired resistance to such movement and noiseless contact between the side bearing and the car body are here obtained by bonding to the top 20 of the head 19 a strip 21 of brake-lining or like material which, like rubber, is inherently of high frictional resistance and sound-deadening. This strip of brake-lining material spaces the metal cap member 7 from the car body and also serves as a replaceable wear plate of excellent wear-resistance to save the cap member from wear.

Contained between and bonded to faces which are fixed, respectively, to the housing 1 and the cap member 7 and are substantially parallel both to each other and to the direction of relative movement of the cap member under vertical load, the rubber pads 8 are subjected only to shear forces by the car body as it moves vertically relative to the truck mounting the side bearing. The resistance of the rubber to such forces, although not constant, increases at a substantially constant rate over the range of compressive movement. While, throughout this movement, the rubber pads are also preferably under compression, this compression is a function entirely of the predetermined lateral forces applied to the rubber on tightening of the bolts, and is not varied by relative movement of the car body and the housing of the side bearing. Consequently, the side bearing of the present invention applies a constant resistance to relative vertical movement of the truck bolster or other member on which it is mounted and the car body, which varies at a substantially constant rate, thus approximating the requirements, as well, on conditions of an ideal side bearing and effectively preventing car body nosing and truck shimmying.

As the side bearing is designed to be mounted with its longitudinal dimension disposed longitudinally of the car body and transversely of the truck bolster on which it will usually be mounted, it approximates the ideal requirements, as well, on swivelling of the truck relative to the car body since, there again, the rubber is subjected only to shear forces. Only on movement of the cap member 7 laterally of the housing 1 would there be a change in the compression on the rubber and thus a variation in its resistance. Since in view of the transverse disposition of the side bearing relative to the truck bolster, such lateral movement would not occur except on transverse movement of the truck bolster relative to the car body and such movement is negligible, compression under car body load is not a factor in the normal operation of the side bearing.

It will be evident that the vertical and longitudinal forces, the only ones to which the side bearing will be subjected in normal operation, both act along a longer dimension of the rubber pads. This action, coupled with the energy absorption inherent in rubber, renders the side bearing soft in action and, contrary to side bearings using coil springs, capable of snubbing its own movements without the use of a built-in snubbing device.

It has been mentioned that the side bearing is compressed or contracted to working height on installation. While some variation is acceptable, it is preferred that the working height of a given side bearing be substantially the same, regardless of the spacing of the members between which the side bearing is interposed. This sameness in working height may readily be obtained by inserting one or more shims 22, as necessary, between the base plate 4 and the member on which the side bearing is mounted.

From the above detailed description, it will be apparent that there has been provided an improved resilient side bearing which is simple in construction, silent in operation and applies resistance which varies at a substantially constant rate throughout its range of travel under operating conditions. It should be understood that the described and disclosed embodiment is merely exemplary of the invention and that all modifications are intended to be included which do not depart either from the spirit of the invention or the scope of the appended claims.

Having described my invention, I claim:

1. The combination, with a railway truck and a car body, of a resilient side bearing interposed therebetween, said side bearing comprising a base member mountable on said truck and having laterally spaced side walls upstanding therefrom, a cap member extending between and spaced from said walls for limited vertical and horizontal movement relative to said base member, said cap member having a bearing surface constantly urgeable against an underside of said car body, substantially vertically disposed confronting faces carried by said side walls and cap member, said faces being substantially planar and parallel and extending substantially in a direction of horizontal movement of said car body relative to said truck, and rubber means interposed between and bonded to said faces and subjected to shear alone by said relative vertical movement of said base and cap members.

2. The combination, with a railway truck and a car body, of a resilient side bearing interposed therebetween, said side bearing comprising a housing mountable on said truck and having laterally spaced upstanding side walls, a cap member extending between said side walls and movable vertically and horizontally relative to said housing, means connecting said housing and cap member for limiting said relative vertical movement, substantially vertically disposed confronting faces fixed against movement to said side walls and cap member, said faces being substantially planar and parallel and extending substantially in a direction of relative horizontal movement of said body and truck, rubber means interposed between and bonded to said faces, and friction and sound-deadening means on an upper face of said cap member for spacing said cap member from and directly and constantly engaging an underside of said car body.

3. The combination, with a railway truck and a car body, of a resilient side bearing interposed therebetween, said side bearing comprising a housing member mountable on said truck and having transversely spaced side walls upstanding therefrom, a T-shaped cap member movable vertically and horizontally relative to said housing member and having its stem extending between said side walls, said cap member having its head overlying said side walls and carrying a surface constantly urgeable against an underside of said car body, substantially vertically disposed confronting faces fixed against movement to said side walls and stem, said faces being substantially planar and parallel and extending substantially in a direction of relative horizontal movement of said body and truck, rubber pads interposed between and bonded to said faces, and means extending transversely through said side walls and stem for connecting said members and placing said rubber means under predetermined transverse compression.

4. The combination, with a railway truck and a car body, of a resilient side bearing interposed therebetween, said side bearing comprising a housing member mountable on said truck and having transversely spaced side walls upstanding therefrom, a T-shaped cap member movable vertically and horizontally relative to said housing member and having its stem extending between said side walls, said cap member having its head overlying said side walls and carrying a surface constantly urgeable against an underside of said car body, transversely spaced side plates between and engaging said side walls, rubber pads interposed between and bonded to substantially vertically disposed confronting faces on said stem and side plates, said faces being substantially planar and parallel and extending substantially in a direction of relative horizontal movement of said body and truck, and means extending through said side walls, side plates and stem for fixing said side plates against movement relative to said side walls, limiting said relative movement of said cap and housing members and placing said rubber pads under predetermined transverse compression.

5. The combination, with a railway truck and a car body, of a resilient side bearing interposed therebetween, said side bearing comprising a housing member mountable on said truck and having transversely spaced side walls upstanding therefrom, a T-shaped cap member movable vertically and horizontally relative to said housing member and having its stem extending between said side walls, said cap member having its head overlying said side walls and carrying a surface constantly urgeable against an underside of said car body, transversely spaced side plates between and engaging said side walls, rubber pads interposed between and bonded to substantially vertically disposed confronting faces on said stem and side plates, said faces being substantially planar and parallel and extending in a direction of relative horizontal movement of said body and truck, and rectangular-shanked bolt means extending transversely through rectangular slots in said side walls, side plates and stem for fixing said side plates against movement relative to said side walls and placing said rubber pads under predetermined transverse compression, said slots in said stem being vertically elongated and determining the range of said relative vertical movement of said cap member.

6. A resilient side bearing for railway vehicles comprising a housing member having transversely spaced upstanding side walls adapted to extend substantially longitudinally of a railway vehicle body, a T-shaped cap member movable vertically and longitudinally relative to said housing member and having its stem extending between and overlapping said side walls, transversely spaced side plates between and engaging said side walls, rubber pads interposed between and bonded to confronting faces on said stem and side plates, said faces being disposed parallel to each other and to the directions of said relative movement of said cap member, square-shanked bolts extending through rectangular slots in said side walls, side plates and stem for fixing said side plates against movement to said side walls and placing said rubber pads under predetermined transverse compression, said slots in said stem being vertically and longitudinally elongated and determining the ranges of said relative movements of said cap member, and friction and sound-deadening means bonded to an upper face of said cap member for spacing said cap member from and directly engaging said vehicle body.

References Cited in the file of this patent

UNITED STATES PATENTS

| 1,810,718 | Lord | June 16, 1931 |
| 2,138,175 | Keys | Nov. 29, 1938 |
| 2,138,449 | Hallquist | Nov. 29, 1938 |
| 2,543,484 | Borup | Feb. 27, 1951 |
| 2,569,617 | Parson | Oct. 2, 1951 |
| 2,698,208 | Dilg | Dec. 28, 1954 |

FOREIGN PATENTS

| 132,776 | Sweden | Sept. 4, 1951 |